United States Patent [19]

Nevitt

[11] 4,381,993

[45] May 3, 1983

[54] PROCESS FOR TREATING HYDROCARBON FEEDSTOCKS WITH CO AND $H_2O$ IN THE PRESENCE OF STEAM STABLE CATALYSTS

[75] Inventor: Thomas D. Nevitt, Naperville, Ill.

[73] Assignee: Standard Oil Company (Indiana), Chicago, Ill.

[21] Appl. No.: 311,166

[22] Filed: Oct. 14, 1981

[51] Int. Cl.³ .................. C10G 45/26; C10G 49/18
[52] U.S. Cl. ............................ 208/217; 208/243; 208/244; 208/251 H; 208/253; 208/254 H; 208/260; 208/292
[58] Field of Search ............... 208/217, 251 R, 251 H, 208/254 R, 254 H, 292, 253, 260, 209, 243, 244, 214

[56] References Cited

U.S. PATENT DOCUMENTS

| | | | |
|---|---|---|---|
| 3,287,280 | 11/1966 | Colgan et al. | 252/435 |
| 3,719,588 | 3/1973 | Vernon et al. | 208/209 |
| 3,728,252 | 4/1973 | Pitchford | 208/243 |
| 3,749,664 | 7/1973 | Mickelson | 208/254 H |
| 3,755,150 | 8/1973 | Mickelson | 208/217 |
| 3,850,841 | 11/1974 | Aldridge et al. | 252/373 |
| 3,904,550 | 9/1975 | Pine | 208/217 |
| 3,960,706 | 6/1976 | McCollum et al. | 208/112 |
| 3,974,096 | 8/1976 | Segura et al. | 252/439 |
| 4,202,798 | 5/1980 | Johnson et al. | 208/254 H |
| 4,210,560 | 7/1980 | Kehl | 252/437 |
| 4,255,282 | 3/1981 | Simpson | 208/254 H |

OTHER PUBLICATIONS

Takemura et al.; J. Japan Petrol. Inst.; vol. 24, No. 6, (1981); 357–362.

*Primary Examiner*—Delbert E. Gantz
*Assistant Examiner*—O. Chaudhuri
*Attorney, Agent, or Firm*—Stephen L. Hensley; William T. McClain; William H. Magidson

[57] ABSTRACT

Hydrocarbon feeds are treated to remove sulfur, nitrogen, oxygen, metals and/or other impurities by contact with treating gas comprising carbon monoxide and water under reaction conditions in the presence of catalysts having shift and hydrogenating activity as well as improved steam stability. The catalysts comprise (1) a metallic component having shift and hydrogenating activity, (2) a support component comprising activated alumina and (3) a steam stabilizing phosphorus component.

16 Claims, No Drawings

PROCESS FOR TREATING HYDROCARBON FEEDSTOCKS WITH CO AND H₂O IN THE PRESENCE OF STEAM STABLE CATALYSTS

BACKGROUND OF THE INVENTION

This invention relates to treating or hydrocarbon feed materials to remove sulfur, nitrogen, oxygen, metals and/or other impurities. More particularly, the invention relates to an improved treating process for hydrocarbon feeds such as petroleum and synthetic crudes in which feed is contacted with a treating gas comprising carbon monoxide and water in the presence of a steam stable catalyst comprising (1) a metallic component having activity for both watergas shift and hydrogenation reactions, (2) a support component comprising activated alumina, and (3) a steam-stabilizing phosphorous component. In a specific embodiment, the invention relates to an improved process for desulfurization of sulfur-containing hydrocarbon feeds.

It is known that hydrocarbon feeds such as petroleum and synthetic crude oils and fractions thereof can be treated to remove sulfur, nitrogen, metals and/or other contaminants by contacting the feed with a mixture of water and carbon monoxide in the presence of bifunctional or dual catalyst systems having activity for the watergas shift reaction, whereby water and carbon monoxide are shifted to product comprising molecular hydrogen, and hydrogenation activity, whereby hydrogen reacts with contaminant-containing molecules of the feed to form easily removable contaminant-containing products, e.g., $H_2S$, $NH_3$. Such processes can offer advantages over typical hydrotreating processes because the need for separate hydrogen generating facilities is reduced or eliminated. U.S. Pat. No. 2,711,419 (Milbourne et al.), while primarily directed to production of fuel gas by a three-step process involving (1) reforming sulfur-containing naphtha-type feed in the presence of a nickel group catalyst promoted by a refractory oxide to form hydrogen and carbon monoxide, (2) passing product gas through a scrubber or absorber to remove sulfur and (3) methanating the sulfur-free gas, notes that some conversion of organic sulfur compounds to hydrogen sulfide takes place in the reforming step. U.S. Pat. No. 3,586,621 (Pitchford et al. '621) discloses treatment of heavy hydrocarbons to convert the same to more valuable products by contacting with steam in the presence of a barium-promoted nickel spinel catalyst ($NiAl_2O_4$). Pitchford et al. '621 also discloses that sulfur-containing feeds can be desulfurized by contact with watergas in the presence of the above-described catalysts and that water requirements in such processes are more severe than in processes for treatment of low sulfur feeds. U.S. Pat. No. 3,676,331 (Pitchford '331) discloses a process similar to that of Pitchford et al. '621 except that the catalyst is a dual one containing a barium, calcium, strontium or magnesium carboxylate component having shift activity, and a nickel, cobalt or iron carboxylate component having hydrogenating activity. The catalysts are not used in supported form, but rather, are dissolved in the feed to be treated. U.S. Pat. No. 3,719,588 (Vernon et al.) and U.S. Pat. No. 3,728,252 (Pitchford '252) disclose similar processes wherein conventional hydrodesulfurization, hydrodenitrogenation or hydrogenation type catalysts are used.

Among the foregoing, Vernon et al. and Pitchford et al. '252 employ catalysts identical or similar to conventional hydroprocessing catalysts, thus offering advantages in terms of catalyst cost and availability as well as compatibility with typical hydroprocessing processes. Conventional hydroprocessing catalysts typically contain a metallic component having hydrogenating activity and a support component containing at least one refractory metal oxide. Metallic components based on metals of Groups VIB and VIII, and combinations thereof, have found wide use in industry owing to their activity, availability and other factors. Commercially preferred supports contain activated alumina owing to its physical strength, high surface area and pore volume, well developed pore structure and ability to interact with the metallic component to provide catalysts of improved activity and lifetime.

Despite the desirable features of activated alumina and catalysts based thereon, the use of such materials in the above-described watergas-treating processes is not entirely satisfactory due to the susceptibility of activated alumina to severe hydration in the high temperature and high steam partial pressure environment employed according to such processes. Hydration of activated alumina results in conversion thereof to the less desirable, low surface area boehmite form, swelling of catalyst particles to the point of becoming mushy, drastic losses in catalyst crush strength, plugging of process equipment, plugging of catalyst bed in fixed bed processes, loss of adequate bed expansion and catalyst mobilization in expanded bed operations, and ultimately, process failure. Of course, such problems can be avoided by appropriate replacement of catalyst; however, the frequency of replacement typically is so high that any advantage associated with reducing hydrogen generating costs via the shift reaction are lost. Accordingly, the instability of activated alumina and catalysts based thereon to steam under reaction conditions renders treating of hydrocarbon feeds with watergas impractical.

It would be desirable to improve the above-described processes in terms of catalyst stability and lifetime so that the advantages associated with generation of hydrogen by the shift reaction could be more fully exploited. It is an object of this invention to provide such an improved process. A further object is to provide an improved process for treating hydrocarbon feeds to remove contaminants, such as sulfur, nitrogen, oxygen and metals, by contact with a treating gas comprising water and carbon monoxide wherein improved catalyst lifetime and stability are attained. A more specific object is to provide an improved desulfurization process in which hydrogen requirements are reduced through the use of a treating gas comprising water and carbon monoxide and a steam-stabilized catalyst having both shift and hydrogenating activity. Other objects of the invention will be apparent to persons skilled in the art from the following description and the appended claims.

I have now found that the objects of this invention can be attained through the use of an improved catalyst composition comprising (1) a metallic component having shift and hydrogenating activity, (2) a support component comprising activated alumina, and (3) a steam-stabilizing phosphorus component in treating hydrocarbon feeds with a treating gas comprising water and carbon monoxide. Advantageously, the use of such improved catalysts in the high temperature and high steam partial pressure environment required for effective treating yields good results in terms of removal of contaminants and with improved catalyst lifetime. Further, the invented process offers advantages in that the steam-stabilized catalyst composition to be employed can be prepared by simple techniques with incorporation of the steam-stabilizing phosphorus component into the composition being possible at a variety of points during catalyst preparation.

While incorporation of phosphorus components into various catalysts and catalyst supports has been proposed for various purposes in the past, it could not have been predicted that incorporation of a phosphorus component into catalysts comprising a metallic component having shift and hydrogenating activity and a support component comprising activated alumina would have a steam-stabilizing effect sufficient to permit long term use in hydrocarbon treating processes conducted in an environment containing steam at high temperature and partial pressure. U.S. Pat. No. 3,287,280 (Colgan et al. '280) discloses that phosphoric acid residues remaining in hydrodesulfurization catalysts prepared by impregnation of alumina with phosphoric acid solution or solutions of nickel and molybdenum salts impart thermal stability to the catalysts and that on steaming at 705° C. such catalysts lose less surface area then comparative catalysts prepared without use of phosphoric acid. Of course, the patentee's steaming temperature is so severe that it is difficult to predict whether use of phosphoric acid would have an appreciable effect relative to the comparative catalyst under process conditions employed according to the present invention. In any event, the patentee does not suggest that such use of phosphoric acid would lead to catalysts of improved resistance to hydration and the accompanying mushiness and losses in crush strength. Further, the patentee is silent with respect to shift activity and the effect of phosphoric acid thereon, thus clearly failing to suggest or contemplate use of a phosphorus component to steam stabilize catalysts having both shift and hydrogenating activity in order to permit long term use in hydrocarbon treating processes conducted in an environment containing steam at high temperature and partial pressure.

U.S. Pat. No. 3,403,111 (Colgan et al. '111) is directed to improving the crush strength of silica-free alumina-supported catalysts subjected to regeneration in the presence of steam. The improvement is attained by treatment of the silica-free alumina support with nitric acid prior to impregnation of active metal component precursors. There is, however, no disclosure or suggestion that a similar effect could be achieved with phosphoric acid. Further, the steam pressures to which the patentee's catalysts are subjected are less severe than those employed according to the present invention, so even if the teachings with respect to nitric acid could be extended to phosphoric acid, it could not reasonably be concluded that incorporation of a phosphorus component would lead to improved steam stability or crush strength in the environment of the present invention. Similar to Colgan et al. '280, Colgan et al. '111 is silent with respect to shift activity.

U.S. Pat. No. 3,840,472 (Colgan '472) is similar to Colgan et al. '280 in disclosing the use of phosphoric acid solutions of hydrogenating metal salts to impregnate catalyst supports. Unlike Colgan et al. '280, however, Colgan '472 is silent with respect to steam or its effects on catalyst performance or properties. Colgan '472 also is silent with respect to shift activity.

U.S. Pat. No. 3,879,310 (Rigge et al.) discloses active aluminas of improved thermal stability and utility in isomerization processes prepared by incorporation of phosphate anion into pseudoboehmitic alumina. There is no disclosure, however, with respect to steam stability, or compositions containing an active metallic component and the disclosed stabilized aluminas, or with respect to use of the patentee's alumina as a support for catalysts to be employed in processes involving both shift and hydrogenating reactions.

Other patents and publications of possible interest to the present invention are U.S. Pat. No. 2,917,532 (Watkins)—hydrotreating process involving a first stage in which hydrogen is obtained from watergas prepared by contacting water, methane and $CO_2$ with a catalyst containing nickel, iron, cobalt, vanadium, chromium, molybdenum or copper supported on silica, alumina, zirconia or magnesia, preferably nickel on magnesia; U.S. Pat. No. 3,711,426 (Jorgensen)—high temperature shift catalyst containing lead oxide-promoted iron oxide; abstract of U.S. Pat. No. 3,740,193 (Esso)—cesium carbonate as stable shift catalyst; U.S. Pat. Nos. 3,850,840 and 3,850,841 (both Aldridge et al.)—shift catalysts containing at least one Group VB, VIB or VIII metal component and at least one alkali metal component and, optionally, a support; U.S. Pat. No. 3,974,096 (Segura et al. '096)—shift catalyst containing at least one Group VB, VIB or VIII metal component, at least one alkali metal component, halogen and, optionally, a support; U.S. Pat. No. 4,054,644 (Segura et al.)—watergas shift process using catalyst of Segura et al. '096. None of the foregoing discloses or suggests the process of the present invention.

DESCRIPTION OF THE INVENTION

Briefly, the process of this invention comprises contacting a hydrocarbon feed with treating gas comprising carbon monoxide and water under reaction conditions in the presence of a catalyst comprising (1) a metallic component having shift and hydrogenating activity, (2) a support component comprising activated alumina, and (3) a steam-stabilizing phosphorus component. According to a specific aspect of the invention, sulfur-, nitrogen- and/or oxygen-containing feeds are desulfurized and/or denitrogenated by contact with treating gas comprising carbon monoxide and water under reactions conditions in the presence of a catalyst comprising (1) a metallic component having shift and hydrogenating activity and comprising nickel and/or cobalt, (2) a support component comprising activated alumina, and (3) a steam-stabilizing phosphorus component present in an amount ranging from about 0.5 to about 20 wt%, expressed as $P_2O_5$ and based on total catalyst weight.

In greater detail, the hyrocarbon feeds employed according to this invention are those containing levels of impurities such as sulfur, nitrogen, oxygen and/or metals high enough to be deleterious from the standpoint of downstream processing and/or end use. Petroleum and synthetic crude oil-derived feeds such as whole petroleum, shale and tar sands oils and coal and biomass liquids, as well as distillate, gas oil and residual fractions thereof are suitable feed materials. The invented process is particularly useful for desulfurization of feeds containing medium or high levels of sulfur, e.g., at least about 1.5 wt%, especially good results being attained in treatment of distillates, heavy and light vacuum gas oils and catalytic cycle oils. Particularly good results also are attained with respect to feeds containing relatively high levels of nitrogen, e.g., at least about 0.5 wt%, examples of such feeds being whole shale oils and fractions thereof. Feed materials such as shale oils, coal liquids and biomass liquids also are well suited for treating in accordance with the present invention because such feeds typically contain substantial levels of oxygenated compounds capable of reacting with hydrogen to generate water thereby satisfying at least a portion of the treating gas water requirement.

The treating gas with which the aforesaid feed is contacted comprises carbon monoxide and water. Treating gas is employed in amounts such that at least a substantial portion of the hydrogen required for treating a given feed is supplied by the watergas shift reaction. Broadly, hydrogen addition rates range from about 200 to about 10,000 standard cubic feet per barrel of feed (SCFB) with hydrogen consumption rates ranging from about 200 to about 3,000 SCFB. Preferably, at least about 20 vol% of the hydrogen addition rate is provided by the shift reaction in order to appreciably reduce costs associated with separate hydrogen generation. More preferably, about 45 to about 100 vol% of the hydrogen requirement is supplied by shifting watergas in order to reduce hydrogen generation costs. The balance of the hydrogen requirement can be satisfied by hydrogen from other suitable sources, e.g. reformer by-product.

Relative proportions of steam and carbon monoxide in the treating gas are not critical so long as at least a stoichiometric proportion of steam is present. Preferably, the molar ratio of steam to carbon monoxide is greater than about 1:1 in order to ensure generation of sufficient hydrogen while also compensating for minor losses of hydrogen through side reactions such as methanation. More preferably, the steam to carbon monoxide ratio exceeds about 1:1 but is less than about 2.5:1 in order to insure generation of sufficient hydrogen while avoiding exposure of catalyst to excessive steam.

Any suitable source of treating gas is contemplated according to the invention. A preferred source is synthesis gas obtained by coal gasification in view of its cost and availability. Coal gasification processes are well known, and typically involve contacting coal, preferably in finely divided form, with oxygen and steam at high temperature and pressure. An example of such a process is found in U.S. Pat. No. 4,186,079. Other suitable sources of treating gas include steel mill coking gas and products from partial oxidation of residual fuels. Of course, irrespective of the source of treating gas, adjustments in composition can be achieved by addition of appropriate gases.

Conditions employed in treatment of hydrocarbon feeds according to this invention will vary depending on the choice of feed. Broadly, temperatures range from about 500° to about 850° F. (about 260° to about 455° C.), pressures from about 100 to about 3000 psig (about 7 to about 210 kg/m$^2$) and space velocities from about 0.1 to about 10 pounds feed per pound of catalyst per hour. As noted hereinabove, hydrogen addition typically ranges from about 200 to about 10,000 SCFB and consumption from about 200 to about 3,000 SCFB. Further details with respect to specific conditions to be used in treatment of various feeds are set forth in the following table.

| FEED | TEMP. (°F.) | PRESSURE (psig) | H$_2$ ADDITION RATE (SCFB) | SPACE VELOCITY (lb/lb/hr catalyst) |
|---|---|---|---|---|
| Naphthas | 600–750 | 200–700 | 350–1200 | 2–8 |
| Distillates | 600–750 | 300–750 | 400–1000 | 2–4 |
| Gas Oils | 600–750 | 500–1000 | 800–1600 | 1–4 |
| Decanted Oil | 600–750 | 500–1000 | 800–1200 | 1–2 |
| Residua | 600–800 | 1000–2500 | 2000–8000 | 0.2–2 |

The catalyst employed according to the present invention exhibits shift and hydrogenating activity as well as long term resistance to hydration and retention of crush strength under process conditions. The catalyst comprises (1) a metallic component having both hydrogenating and shift activity, (2) a support component comprising activated alumina and (3) a steam stabilizing phosphorus component.

In greater detail, the metallic component having shift and hydrogenating activity contains at least one Group VIII non-noble metal component, i.e., a nickel, cobalt or iron component. This component can be in the form of the elemental metal and/or an oxide and/or sulfide thereof. Components containing combinations of Group VIII non-noble metals can be employed if desired. Preferred Group VIII non-noble metal components are those comprising nickel and/or cobalt as these exhibit a desirable combination of high shift and hydrogenating activity. As between nickel and cobalt, nickel is most preferred from the standpoint of shift activity; however, in desulfurization processes, cobalt is preferred from the standpoint of desulfurization activity.

In addition to the above-described Group VIII non-noble metal component, the metallic component can contain one or more shift and/or hydrogenation promoting components. Useful shift promoters include components based upon the alkali and alkaline earth metals such as barium, calcium, magnesium and potassium. Typically, these are present in the form of an oxide. Useful components for promoting hydrogenation activity include those comprising vanadium and/or the Group VIB metals such as molybdenum, chromium and tungsten. Like the Group VIII non-noble metal component, these can be present in elemental form, as oxides and/or as sulfides. The catalysts to be employed according to the invention also can include combinations of shift promoters, combinations of hydrogenation promoters and combinations thereof. A preferred shift promoter according to the invention is potassium oxide due to its capacity to suppress methane formation and thereby avoid consumption of hydrogen otherwise capable of participating in hydrogenation reactions. Preferred hydrogenation promoters comprise molybdenum due to the activity thereof.

The metallic component having shift and hydrogenating activity is present in the catalyst in a catalytically effective amount. The precise amount will vary depending upon the constituents of the metallic component and the choice of feed to be treated. Preferably, the Group VIII non-noble metal component is present in an amount ranging from about 0.5 to about 15 wt% expressed as metal oxide and based upon total catalyst weight. Below about 0.5 wt%, activity can suffer while above about 15 wt%, improvements in activity typically are insufficient to justify the cost of the added metal or metals. More preferably, Group VIII non-noble metal content ranges from about 1 to about 8 wt%. When shift and/or hydrogenation promoting components are included in the catalyst, they are present in amounts effective to promote shift and/or hydrogenating activity. Preferred levels of shift promoters range up to about 15 wt% expressed as metal oxide and based upon total catalyst weight. More preferably, shift promoter is present in an amount ranging from about 1 to about 5 wt% in order to attain suitable promotional effect without adversely affecting hydrogenation activity. Hydrogenation promoters preferably are present in an amount ranging from about 5 to about 25 wt%, and more preferably, about 8 to about 18 wt% in order to provide an economically advantageous promoting effect.

The support component of the catalyst comprises activated alumina. Activated alumina is well known to those skilled in the art and typically is prepared by controlled heating of various hydrated aluminas such as the mono- and trihydrates to substantially remove their water of constitution. Typical crystal structures of activated aluminas include gamma, etc, chi and rho, BET surface areas typically are at least about 100 m$^2$/g and pore volumes typically are at least about 0.5 cc/g. Preferred activated aluminas are those exhibiting surface areas of at least about 150 m$^2$/g in view of their higher activity. Further details with respect to suitable activated aluminas are found in U.S. Pat. No. 4,024,231 (Ziegenhain) which is incorporated herein by reference.

In addition to activated alumina, the support component employed according to this invention can contain various adjuvants. Examples include other refractory metallic oxides such as silica, magnesia and zirconia; other inorganic oxides such as phosphorus oxides; and halogens such as fluorine.

The support component typically makes up at least about 60 wt% of the total catalyst, with at least about 50 wt% of the component consisting of activated alumina. More preferably, the support component makes up at least about 75 wt% of total catalyst weight. Further, preferred support compositions are those in which at least about 75 wt% of support weight is provided by activated alumina in order to insure high hydrogenation activity and physical strength.

The steam-stabilizing phosphorus component of the catalyst employed according to the invention is present in an amount and form effective to render the catalyst composition resistant to hydration and losses in crush strength in the high temperature and steam partial pressure environment employed according to the invented process. The precise chemical identity of the phosphorus component is not presently known. Without wishing to be bound by any particular theory, it can be theorized that the component is present in the form of one or more oxides of phosphorus and/or complex oxides containing phosphorus and metal or metals linked via oxygen. Preferably, the phosphorus component is present in an amount ranging from about 0.5 to about 20 wt% expressed as P$_2$O$_5$. Lesser amounts of phosphorus can be incorporated but typically provide only limited steam stability while phosphorus contents greater than 20% also are contemplated but are not preferred because the same typically yield only limited advantage over the 20 wt% level. More preferably, phosphorus levels range from about 2 to about 15 wt% expressed as P$_2$O$_5$.

The phosphorus component can be incorporated into the catalyst by any suitable means. As one suitable method of incorporation, precursors to the phosphorus component can be included during the support preparation such that an alumina-aluminum phosphate or phosphated-alumina composition is attained. For example, catalyst supports comprising alumina and aluminum phosphate can be prepared by hydrolysis of aluminum alkoxides with aqueous phosphoric acid followed by recovery of a precipitate and calcination thereof. Alternately, an aqueous solution of aluminum cations and phosphate anions can be neutralized at controlled pH to precipitate a solid containing alumina and aluminum phosphate after which the solid can be calcined to form a support composition. Further details with respect to phosphorus-containing supports prepared in this manner are found in U.S. Pat. No. 3,904,550 (Pine) and U.S. Pat. No. 4,080,311 (Kehl), both of which are incorporated herein by reference.

Phosphated-alumina supports also are contemplated according to the invention. These can be prepared, for example, by coagulation or coprecipitation of a precursor to the phosphorus component such as phosphoric acid or a salt thereof and a second acid or salt, e.g., sulfuric acid, followed by addition thereof to an aqueous solution of alkali metal aluminate to form a precipitate which is then calcined. Further details with respect to preparation of phosphated-alumina supports are found in U.S. Pat. No. 4,003,828 (Eberly, Jr.) and U.S. Pat. No. 4,066,572 (Choca), both of which are incorporated herein by reference.

The steam-stabilizing phosphorus component also can be incorporated subsequent to formation of the catalyst support, for example, by treatment of support with a precursor to the phosphorus component such as an oxyacid of phosphorus or an ester or salt thereof. Phosphoric acid is preferred owing to its cost, availability and ease of use. Further details with respect to such a preparation are found in U.S. Pat. No. 3,969,273 (Brown et al.) which is incorporated herein by reference.

It also is contemplated to incorporate the component through the use of phosphorus component precursor as a solvent for impregnating solutions of precursors to the constituents of the metallic component having shift and hydrogenating activity. Phosphoric acid is a preferred precursor for such a preparation. Further details with respect to the use of phosphoric acid impregnating solutions are found in the Colgan and Colgan et al. patents discussed hereinabove and in U.S. Pat. No. 3,897,365 (Feins et al.). All of these patents are incorporated herein by reference.

It also is contemplated to incorporate the steam stabilizing phosphorus component by treating a preformed catalyst with phosphoric acid or other suitable precursor to the steam stabilizing component. The precursor should be one capable of reaction with the preformed catalyst so that sufficient phosphorus is incorporated into the catalyst. Phosphoric acid is preferred from this standpoint and is desirably used in relatively concentrated form. Subsequent to contacting of the preformed catalyst with precursor to the phosphorus component it is preferred to calcine the result, preferably at a temperature ranging from about 600° to about 1,200° F. for a period of several minutes to several hours.

Combinations of the above-described methods of incorporating a phosphorus component also are contemplated according to the invention.

From the standpoint of shift and hydrogenation activity, preferred methods of incorporating the steam stabilizing phosphorus component are to treat a preformed support with at least one precursor to the stabilizing component prior to impregnation of active metallic component, or to treat a preformed catalyst composition with at least one precursor to the stabilizing component. In both methods the preferred precursor is phosphoric acid. As between treatment of support and treatment of a finished catalyst, the latter is preferred because it leads to the best total effect in terms of shift and hydrogenation activity and hydration resistance.

In other respects, preparation of the catalyst to be employed according to the present invention is conducted according to known techniques. Typically, a support in powdered or shaped form is contacted with one or more solutions of the compounds of the metallic component after which the result is calcined at a temperature effective to convert salts of the metallic components to oxides. It also is contemplated, however, to attain the desired association between support and metallic component by grinding or milling support and appropriate compounds of the active metals. When impregnating solutions of the active metal salts are employed, a preferred solvent for the solutions is water in view of its low cost; however, other appropriate solvents such as alcohols and phosphoric acid can be employed.

A catalyst that is particularly preferred for desulfurization of high sulfur feeds in the presence of treating gas comprising water and carbon monoxide according to the invention contains about 15 to about 25 wt% metallic component made up of about 2 to about 6 wt% nickel, expressed as NiO, and about 8 to about 18 wt% molybdenum, expressed as $MoO_3$, a support component comprising activated alumina, and about 2 to about 8 wt% phosphorus expressed as $P_2O_5$, such phosphorus being incorporated into the catalyst by treatment with phosphoric acid of a composition obtained by impregnating activated alumina with one or more solutions of precursors to the nickel and molybdenum components and then drying and calcining the result. Such catalysts give particularly good results in terms of shift and desulfurization activity and are highly resistant to hydration of the activated alumina under process conditions. Incorporation of up to about 5 wt% potassium oxide also can be beneficial from the standpoint of retarding methane generation; however, the presence of potassium oxide also tends to lower somewhat desulfurization activity.

The present invention is described in further detail in the following examples, it being understood that the same are for purposes of illustration and not limitation.

GENERAL EXPERIMENTAL PROCEDURE

Desulfurization tests were conducted in a small scale pilot plant consisting of a one-half inch, schedule 80 Hasteloy pipe about 30 inches in length with four resistance wire-wound and independently controlled heaters. A thermowell extended axially from the bottom of the reactor is approximately two inches from the top thereof. The reactor was equipped with a flow control system to monitor gas flow to the reactor. Oil was metered into the system at high flows (greater than 50 g/hr) with a Whitey pump or at low rates with a Ruska pump. Water was also added with a Ruska pump.

Approximately 15 grams of catalyst were ground to a 14-20 mesh size and then loaded into the reactor in an area centered at about two-thirds of the distance from the top of the reactor. Prior to start-up the catalyst was heated from room temperature to about 450° F. in oil and nitrogen at 400 psig over about ½—1 hour. When the catalyst bed temperature reached 450° F. a mixture of hydrogen and hydrogen sulfide containing 8% of the latter was passed over the catalyst for about an hour after which the flow of hydrocarbon feed and treating gas was initiated. Vapor and liquid products from the reactor were removed therefrom and separated and the gas was passed through a backflow valve which controlled reactor pressure.

The hydrocarbon feeds used in all runs were light catalytic cycle oils having properties shown in the following table.

| Property | Feed I | Feed II |
|---|---|---|
| API Gravity (°) | 24.5 | 24.2 |
| ASTM Distillation (°F.) | | |
| IBP | 381 | 268 |
| 5% | 415 | 428 |
| 10% | 457 | 446 |
| 20% | 483 | 462 |
| 30% | 495 | 476 |
| 40% | 503 | 490 |
| 50% | 515 | 504 |
| 60% | 527 | 520 |
| 70% | 541 | 538 |
| 80% | 558 | 556 |
| 90% | 581 | 580 |
| 95% | 600 | 600 |
| Max. | 621 | 662 |
| Sulfur (wt %) | 1.92 | 1.80 |
| Nitrogen (wt %) | 0.029 | ND |
| Hydrogen (wt %) | 10.90 | 11.21 |

Prior to contacting feeds with treating gas comprising carbon monoxide and steam, a series of desulfurizations were carried out using hydrogen as treating gas.

REFERENCE EXAMPLE

A commercial hydrodesulfurization catalyst supplied by American Cyanamid Co. and containing 3.2 wt% nickel oxide and 15 wt% molybdenum oxide supported on a silica-alumina base containing 2 wt% silica based on total catalyst weight was used as a reference. This catalyst, identified hereinbelow as R, was tested at varying conditions as reported in Table I. Results of the runs are reported in Table II.

EXAMPLE I

A steam stabilized catalyst according to the invention was prepared by blending 104 g 85% phosphoric acid in water with 1200 g of a precipitated activated alumina powder supplied by American Cyanamid after which the result was extruded to form ⅛" diameter × ¼" length extrudate, dried at 250° C. for 3 hours and then calcined at 540° C. for 3 hours. The resulting extrudate had a surface area of 356 m²/g and pore volume of 0.77 cc/g.

Subsequently, the result was impregnated with a solution prepared by dissolving 257 g nickel nitrate hexahydrate and 265 g ammonium molybdate in 1000 ml water, drying the result at 250° C. for 3 hours and then calcining at 540° C. for 3 hours.

This catalyst, identified as I hereinbelow, was tested under varying conditions as reported in Table I. Results are reported in Table II.

COMPARATIVE EXAMPLES

Desulfurization tests were conducted using the following comparative catalysts:

(A) 3.5 wt% NiO and 15 wt% $MoO_3$ supported on magnesium spinel containing about 28 wt% MgO and a balance of aluminum oxide having surface area of 113 m²/g and pore volume of 0.37 cc/g.

(B) 3.5 wt% NiO and 15 wt% $MoO_3$ supported on high soda-type activated alumina (SAP 350) of unknown composition and physical properties but known to be steam stable in view of its utility in auto emission catalyst systems.

(C) 3.5 wt% NiO and 15 wt% $MoO_3$ supported on a colloidal boehmite-type activated alumina (GB 200) of unknown composition and physical properties but known to be steam stable in view of its utility in auto emission catalyst systems. (D) 3 wt% CoO and 16 wt% $MoO_3$ supported on MgO having surface area of 28.3 m²/g, pore volume of 0.21 cc/g and crush strength of 11.8 lbs.

(E) About 3 wt% CoO and about 15 wt% $MoO_3$ supported on a low surface area (64 m²/g) magnesia obtained from the Davison Chemical Division of W. R. Grace & Co. having pore volume of 0.27 cc/g and crush strength of 5.8 lbs.

Comparative catalysts (A)-(E) were tested under conditions reported in Table I. Results are reported in Table II.

EXAMPLE II

A second steam stabilized catalyst according to the invention was prepared by contacting a sample of the reference catalyst (R) with sufficient phosphoric acid to yield a final catalyst containing 2 wt% $P_2O_5$. Contacting was carried out at ambient temperature with stirring for a short time, after which the result was dried and calcined.

This catalyst, identified hereinbelow as II, was tested under conditions reported in Table I. Results are reported in Table II.

EXAMPLE III

A shift-promoted, steam stabilized catalyst according to the invention was prepared according to the procedure of EXAMPLE II except that the catalyst contained 3 wt% $P_2O_5$ and after the final calcination the result was contacted with sufficient aqueous potassium hydroxide to yield a final catalyst containing 3 wt% potassium oxide. The result was then dried and calcined.

This catalyst, referred to hereinbelow as III was tested under conditions reported in Table I. Results are reported in Table II.

TABLE I

| CAT (TEST NO.) | | HOURS ON STREAM | SAMPLE PERIOD | TEMP (°F.) | PRES (psi) | WHSV (g/g/hr) | INLET GAS (moles/hr) | | |
|---|---|---|---|---|---|---|---|---|---|
| | | | | | | | $H_2$ | CO | $H_2O$ |
| R | (1) | 48 | 32 | 603 | 415 | 1.6 | .286 | .286 | .143 |
| | (2) | 208 | 64 | 654 | 415 | 1.6 | .158 | .158 | .143 |
| | (3) | 336 | 48 | 654 | 415 | 1.6 | .586 | 0 | .143 |
| | (4) | 400 | 64 | 654 | 415 | 1.6 | .267 | .267 | .143 |
| | (5) | 480 | 48 | 654 | 315 | 2.4 | .496 | 0 | 0 |
| I | (1) | 80 | 80 | 555 | 250 | 2.13 | .792 | 0 | 0 |
| | (2) | 160 | 32 | 552 | 350 | 1.06 | .682 | 0 | .286 |
| | (3) | 320 | 48 | 555 | 350 | 1.06 | .295 | .295 | .286 |
| | (4)* | 416 | 48 | 550 | 350 | 1.06 | .572 | .101 | .286 |
| | (5)* | 448 | 32 | 550 | 350 | 2.13 | .570 | .099 | .286 |
| | (6)* | 512 | 48 | 636 | 350 | 2.13 | .809 | 0 | 0 |
| | (7)* | 592 | 64 | 636 | 350 | 2.13 | .316 | .316 | .286 |
| A | (1) | 320 | 144 | 646 | 415 | 1.6 | .530 | 0 | 0 |
| | (2) | 528 | 192 | 646 | 415 | 1.6 | .530 | 0 | .286 |
| | (3) | 560 | 32 | 646 | 415 | 1.6 | .449 | .079 | .286 |
| B | (1) | 160 | 112 | 644 | 415 | 1.6 | .530 | 0 | 0 |
| | (2) | 208 | 48 | 644 | 415 | 1.6 | .510 | 0 | .286 |
| C | (1) | 240 | 208 | 643 | 415 | 1.6 | .56 | 0 | 0 |
| D | (1) | 304 | 96 | 643 | 415 | 1.6 | .55 | 0 | 0 |
| E | (1) | 304 | 272 | 646 | 415 | 1.6 | .58 | 0 | 0 |
| R | (6) | 16 | 16 | 541 | 415 | 1.6 | .420 | 0 | 0 |
| | (7) | 224 | 96 | 641 | 415 | 1.6 | .540 | 0 | .286 |
| | (8) | 304 | 80 | 641 | 415 | 1.6 | .360 | .063 | .286 |
| | (9) | 368 | 48 | 640 | 415 | 1.6 | .540 | 0 | 0 |
| II | (1) | 16 | 16 | 541 | 415 | 1.6 | .53 | 0 | 0 |
| | (2) | 160 | 16 | 640 | 415 | 1.6 | .550 | 0 | .286 |
| | (3) | 432 | 64 | 640 | 415 | 1.6 | .915 | 0 | .286 |
| | (4) | 496 | 64 | 641 | 415 | 1.6 | .396 | .396 | .286 |
| III | (1) | 16 | 16 | 541 | 315 | 1.6 | .95 | 0 | 0 |
| | (2) | 128 | 48 | 640 | 415 | 1.6 | .640 | 0 | .286 |
| | (3) | 208 | 64 | 640 | 415 | 1.6 | .265 | .265 | .286 |

*Feed 2 was used in these runs.

TABLE II

| CATALYST (TEST NO.) | | LIQUID PRODUCT (wt %) | | TREATING GAS RATE (SCFB) | RATE CONSTANTS | |
|---|---|---|---|---|---|---|
| | | SULFUR | HYDROGEN | | HDS | SHIFT |
| R | (1) | 0.40 | 11.5 | 3240 | 0.12 | 5.5 |
| | (2) | 0.18 | 11.5 | 1990 | 0.14 | 6.0 |
| | (3) | 0.024 | 11.5 | 2670 | 0.16 | — |
| | (4) | 0.12 | 11.54 | 3130 | 0.15 | 6.3 |
| | (5) | 0.072 | 11.37 | 1570 | 0.15 | — |
| I | (1) | 0.56 | 11.52 | 3050 | 0.46 | — |
| | (2) | 0.12 | 11.83 | 8630 | 0.15 | — |
| | (3) | 0.50 | 11.47 | 8170 | 0.14 | 9.8 |

TABLE II-continued

| CATALYST (TEST NO.) | | LIQUID PRODUCT (wt %) SULFUR | HYDROGEN | TREATING GAS RATE (SCFB) | RATE CONSTANTS HDS | SHIFT |
|---|---|---|---|---|---|---|
| | (4) | 0.27 | 11.82 | 7130 | 0.16 | ND* |
| | (5) | 0.60 | 11.66 | 3430 | 0.18 | ND |
| | (6) | 0.105 | 11.90 | 2810 | 0.16 | — |
| | (7) | 0.44 | 11.66 | 3270 | 0.14 | 11.0 |
| A | (1) | 0.13 | 11.64 | 2440 | 0.09 | — |
| | (2) | 0.21 | 11.72 | 3880 | 0.09 | — |
| | (3) | 0.25 | 11.38 | 3500 | 0.09 | 6.0 |
| B | (1) | 0.26 | 11.6 | 2440 | 0.06 | — |
| | (2) | 0.14 | 11.6 | 2390 | 0.12 | — |
| C | (1) | 0.49 | 11.8 | 2590 | 0.04 | — |
| D | (1) | 0.10 | 11.8 | 2440 | 0.11 | — |
| E | (1) | 0.11 | 11.8 | 2690 | 0.10 | — |
| R | (6) | 0.39 | 11.6 | 1940 | 0.15 | — |
| | (7) | 0.089 | 11.4 | 3820 | 0.16 | — |
| | (8) | 0.114 | 11.4 | 3340 | 0.16 | 7.7 |
| | (9) | 0.060 | 11.6 | 2520 | 0.15 | — |
| II | (1) | 0.62 | 11.5 | 2490 | 0.10 | — |
| | (2) | 0.088 | 11.8 | 4060 | 0.16 | — |
| | (3) | 0.085 | 11.78 | 5776 | 0.15 | — |
| | (4) | 0.138 | 11.50 | 4910 | 0.06 | ND |
| III | (1) | 1.11 | 11.6 | 4600 | 0.06 | — |
| | (2) | 0.17 | 11.4 | 4410 | 0.10 | — |
| | (3) | 0.27 | 11.5 | 3750 | 0.11 | 11.8 |

*ND stands for not determined.

From the tables it can be seen that catalysts I and II according to the invention compared favorably with the conventional desulfurization catalyst (R) in terms of desulfurization rate constant and product sulfur irrespective of treating gas. Catalyst III, also according to the invention, was inferior to catalysts I, II and R in terms of HDS rate constant, presumably due to the presence of the alkali metal shift promoter; however, shift rate constant was high. Comparative catalysts A and B also were somewhat low in desulfurization activity. The remaining comparative catalysts (C-E) gave such poor hydrodesulfurization activity using hydrogen as treating gas that they were not tested using treating gas comprising steam and carbon monoxide.

It also can be seen from the tables that good results were attained using steam stabilized catalyst I under a wide range of process conditions. Thus, variations in temperature, overall pressure, space velocity and partial pressures of hydrogen, steam and carbon monoxide had only minor, if any, effects on desulfurization activity.

EXAMPLE IV

Although the catalysts employed in the previous examples showed little deactivation after prolonged periods of time, particles of some of the catalysts appeared swollen, soft and mushy on removal from the reactor. Evaluation of such catalysts by X-ray diffraction revealed that the alumina had been hydrated to the boehmite form.

To evaluate steam stability a series of tests was conducted according to the following procedure. Samples of catalysts II, III and A were loaded into a small scale reactor similar to that described above in the manner described above after which the reactor was heated to 450° F. The catalysts then were contacted with a mixture of steam and nitrogen at an overall pressure of about 200 psi and steam partial pressure of 75 psi for varying periods of time after which samples were removed and subjected to X-ray diffraction to determine the extent of conversion to boehmite. A similar evaluation was conducted using an activated, gamma alumina (Aero 100) that is typical of commercial desulfurization catalyst supports. Results are reported in TABLE III.

TABLE III

| CATALYST | DAYS ON STEAM | BOEHMITE (wt %) |
|---|---|---|
| II | 34 | 0 |
| III | 58 | 0 |
| A | 23 | Trace |
| Aero 100 | 2 | 0 |
| Aero 100 | 11 | 5 |
| Aero 100 | 15 | 100 |
| Aero 100 | 90 | 100 |

As can be seen from this example and the table, the conventional desulfurization catalyst support exhibited 100% conversion to boehmite after only 15 days. Comparative catalyst A was somewhat more stable, resisting conversion until the 23rd day. In contrast, catalysts II and III containing a steam stabilizing phosphorus component exhibited no conversion after 34 and 58 days respectively.

I claim:

1. A process for treating hydrocarbon feeds to remove contaminants comprising sulfur, nitrogen, oxygen, metals or combinations thereof comprising contacting the feed and a treating gas comprising water and carbon monoxide under reaction conditions in the presence of a catalyst comprising (1) a metallic component having shift and hydrogenating activity, (2) a support component comprising activated alumina and (3) a steam-stabilizing phosphorus component.

2. The process of claim 1 wherein the metallic component having shift and hydrogenating activity comprises at least one Group VIII non-noble metal.

3. The process of claim 2 wherein reaction conditions comprise a temperature of about 500° to about 850° F., pressure of about 100 to about 3000 psig, space velocity of about 0.1 to about 10 pounds feed per pound of catalyst per hour and the treating gas is employed in an amount effective to provide a hydrogen addition rate of about 200 to about 10,000 SCFB.

4. The process of claim 3 wherein the treating gas contains sufficient water and carbon monoxide to satisfy at least about 20 vol% of the hydrogen addition rate.

5. The process of claim 4 wherein steam is present in the treating gas in at least a stoichiometric amount relative to carbon monoxide.

6. The process of claim 2 wherein the steam stabilizing phosphorus component is present in an amount ranging from about 0.5 to about 20 wt% expressed as $P_2O_5$ and based on total catalyst weight.

7. The process of claim 2 wherein the metallic component (1) comprises, in addition to said Group VIII non-noble metal, at least one hydrogenation-promoting component or at least one shift promoting component or a combination of said hydrogenation and shift-promoting components.

8. The process of claim 2 wherein the steam-stabilizing phosphorus component is incorporated into the catalyst through the use of at least one precursor to the phosphorus component during preparation of the support component.

9. The process of claim 2 wherein the steam-stabilizing phosphorus component is incorporated into the catalyst by treatment of the support component with at least one precursor to the phosphorus component prior to incorporation of metallic component into the catalyst.

10. The process of claim 2 wherein the steam-stabilizing phosphorus component is incorporated into the catalyst by impregnation of the support component with at least one solution of at least one precursor to the metallic component in at least one precursor to the phosphorus component.

11. The process of claim 2 wherein the steam-stabilizing phosphorus component is incorporated into the catalyst by treatment of preformed catalyst with at least one precursor to the phosphorus component.

12. The process of any of claims 8-11 wherein the precursor to the phosphorus component comprises phosphoric acid.

13. A process for desulfurization of hydrocarbon feeds containing at least about 1.5 wt% sulfur comprising contacting the feed with treating gas comprising hydrogen, steam and carbon monoxide wherein the molar ratio of steam to carbon monoxide is greater than about 1:1, such treating gas being present in an amount effective to provide a hydrogen addition rate of about 350 to about 8000 SCFB, of which at least 20 vol% is provided by reaction of said water and carbon monoxide, at a temperature of about 600° to about 800° F., pressure of about 200 to about 2500 psig and space velocity of about 0.2 to about 8 lb/lb/hr in the presence of a catalyst comprising (1) a metallic component comprising nickel having shift and hydrogenating activity, (2) a support component comprising activated alumina and (3) a steam-stabilizing phosphorus component.

14. The process of claim 13 wherein the catalyst comprises about 1 to about 8 wt% nickel oxide or cobalt oxide and about 2 to about 15 wt% phosphorus expressed as $P_2O_5$, such weight percentages being based on total catalyst weight.

15. The process of claim 13 wherein the feed comprises a petroleum or synthetic crude oil distillate, gas oil or residue and reaction conditions comprise a temperature of about 600° to about 800° F., pressure of about 300 to about 2500 psig, weight hourly space velocity of about 0.2 to about 4 lb/lb/hr and the treating gas is present in an amount effective to provide a hydrogen consumption rate of about 400 to about 8000 SCFB.

16. The process of claim 15 wherein the catalyst comprises about 2 to about 6 wt% nickel oxide, about 8 to about 18 wt% molybdenum oxide, at least about 75 wt% activated alumina and about 2 to about 8 wt% phosphorus expressed as $P_2O_5$, such weight percentages being based on total catalyst weight.

* * * * *